(12) United States Patent
Lopes

(10) Patent No.: US 6,189,105 B1
(45) Date of Patent: Feb. 13, 2001

(54) PROXIMITY DETECTION OF VALID COMPUTER USER

(75) Inventor: Robert Joseph Lopes, Branchburg Township, Somerset County, NJ (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/026,983

(22) Filed: Feb. 20, 1998

(51) Int. Cl.⁷ .............. G06F 11/30; G06F 12/14; H04L 9/00; H04L 9/32
(52) U.S. Cl. .............. 713/202; 713/200; 713/201; 713/202
(58) Field of Search .............. 713/200, 201, 713/202

(56) References Cited

U.S. PATENT DOCUMENTS

| | | |
|---|---|---|
| 4,685,056 | 8/1987 | Barnsdale, Jr. et al. . |
| 4,857,913 | 8/1989 | Lewiner et al. . |
| 5,355,414 | 10/1994 | Hale et al. . |
| 5,357,563 * | 10/1994 | Hamilton ............... 379/91 |
| 5,396,070 | 3/1995 | Lee . |
| 5,408,668 * | 4/1995 | Tornai ................. 395/750 |
| 5,434,562 | 7/1995 | Reardon . |
| 5,467,082 | 11/1995 | Sanderson . |
| 5,533,125 | 7/1996 | Bensimon et al. . |
| 5,548,764 * | 8/1996 | Duley ................. 395/750 |
| 5,557,259 | 9/1996 | Musa . |
| 5,642,805 | 7/1997 | Tefft . |
| 5,646,539 | 7/1997 | Codina et al. . |
| 5,757,271 * | 5/1998 | Andrew ............... 340/568 |
| 5,892,901 * | 8/1999 | Landwehr ............ 395/186 |
| 5,902,998 * | 5/1999 | Olson ................. 250/221 |
| 5,952,835 * | 9/1999 | Covely ................ 324/671 |
| 5,970,227 * | 10/1999 | Dayan ................. 713/200 |
| 6,002,427 * | 12/1999 | Kipust ................ 348/156 |

* cited by examiner

Primary Examiner—Thomas C. Lee
Assistant Examiner—Chun Cao
(74) Attorney, Agent, or Firm—William H. Bollman

(57) ABSTRACT

A method and apparatus for continuously authorizing a computer for use. A proximity detection system provides a coded message from a badge on an authorized user to a proximity reader in communication with the computer. The computer contains a process either in its kernel, operating system, and/or application program to repeatedly and continuously detect the presence of an authorized user within a desired proximity of the computer. If an authorizing code is received from an authorized user, the computer continues to allow full use of the computer. If an authorizing code is not received, a desired feature of the computer (e.g., the display, the keyboard, the mode of the processor) is disabled until the authorized user again enters the proximity zone of the computer.

21 Claims, 8 Drawing Sheets

PROXIMITY DETECTION OF VALID COMPUTER USER

BACKGROUND OF THE INVENTION

1. Field of the Invention

This invention relates to computer security, and more particularly to the use of a proximity detector to continuously authorize a computer for use only by authorized persons.

2. Background of Related Art

There are many purposes for securing a computer against unauthorized use. For instance, the computer may provide access to accounting records or other sensitive information, particularly when the computer is located in an area accessible by many persons, e.g., as in a large office.

A well known and by far the most prevalent technique for preventing unauthorized access to a computer is by entering a unique password as depicted in FIG. 8. In FIG. 8, an authorized user boots up or otherwise starts a computer 130, perhaps at the beginning of their day. Usually, the computer contains a number of software programs, including an operating system and one or more application programs. Moreover, it is not unusual for the user to be prompted to enter two, three or even more different passwords by the various software programs (e.g., by the operating system, to access a network, and to load a particular application program) before the computer is up and running. A visual prompt for entry of each password is typically printed on the display 112 of the computer 130, which the user subsequently types on the keyboard 110 to gain authorized access for proceeding. While providing some level of security, this process typically requires a significant amount of user input and time before the computer is up and running.

During the business day, the user of the secure computer 130 may have the need to leave the room containing the computer, e.g., to go to the restroom, lunch, etc. However, as long as the computer 130 remains powered up, it will provide access to any user.

To prevent unauthorized access to the computer 130 when the authorized user(s) is (are) out of the room, the most traditional methods require the computer 130 to be turned off. However, this method is rather inconvenient because it causes significant delays in restarting the computer and re-entering the authorizing passwords when the authorized user returns. Moreover, the user may inadvertently forget to turn the computer 130 off when out of the room, leaving the computer susceptible to unauthorized use. Or, worse yet, the user may deliberately leave the computer on for quick absences from the room to eliminate the necessary down time while awaiting rebooting of the computer upon return, perhaps to increase their personal productivity.

An authorizing keyed lock 132 has been added to the external casing of many newer personal computers 130 as shown in FIG. 8. In the unlocked position, there is no change to the ordinary operation of a computer 130. However, when the authorizing keyed lock 132 is turned to the lock position, keyboard entry is prevented.

The authorizing keyed lock 132 is used most often for computers operating as servers or other multi-user tasks, and for computers which are otherwise intentionally not always attended during their operation. However, even when locked out from keyboard entry with the authorizing keyed lock 132 in the lock position, the conventional computer 130 continues to operate as previously authorized and often continues to display information on display 112. The keyed lock usually prevents new keyboard entry—it does not disable previous keyboard entries. Moreover, even an authorizing keyed lock 132 cannot prevent a computer 130 from unauthorized use when the absent user forgets to lock the computer 130 before leaving the room.

There is thus a need for a computer having an authorizing feature which is flexible enough to prevent access when the user steps out of the room even for just a minute, which is automatic without requiring instruction from the authorized user to initiate some security procedure (e.g., powering down) before an absence from the room.

SUMMARY OF THE INVENTION

In accordance with the principles of the present invention, a proximity detection system for a computer comprises means for enabling a computer when a valid user is present, and means for disabling the computer when the valid user is not present.

In another aspect, a proximity detection system comprises a proximity detector in communication with the computer. A timer associated with the computer is operable to expire upon non-receipt of an authorizing code from an authorized user of the computer. A disabling module in the computer disables at least one feature of the computer based on an expiration of the timer.

In another aspect, a proximity detection system in accordance with the present invention comprises a proximity reader in communication with the computer, a detection module which continuously determines a presence of an authorized user within a proximity of the proximity reader, and a disabling module in the computer to disable at least one feature of the computer based on a determination by the detection module that the authorized user is not within the proximity of the proximity reader.

A method of continuously detecting an authorized user within a proximity of a computer in accordance with the present invention comprises repeating steps. In one step, receipt of a coded message from an authorized user is determined to indicate that the authorized user is within a proximity of the computer. As the authorized user moves in and out of the proximity of the computer, at least one function of the computer is enabled and disabled, respectively, based on a receipt of a coded message from the authorized user.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention integrates a proximity detector with a computer to allow autonomy to authorized users while at the same time offering increased security to prevent unauthorized access to sensitive computers.

Proximity detectors are known for use in preventing theft of retail items, for allowing one-time entry through locked gates, etc. For instance, U.S. Pat. Nos. 4,857,913 and 5,467,082 disclose coded proximity devices such as plastic cards capable of being identified at a distance by suitable readers for use in one-time unlocking of a lock. The disclosed badges are inductively coupled to a power source such that the badges need not contain a battery. Each badge is uniquely identified by a preset binary code, which is emitted to a reader to identify an authorizing badge within proximal distance of the reader. The content of U.S. Pat. Nos. 4,857,913, and 5,467,082, is explicitly incorporated herein by reference.

The present invention makes use of coded proximity detectors such as those disclosed in these patents in a unique way and subject to a unique process in the computer, i.e., to uniquely and continuously identify authorized users within proximal or visual distance of a relevant computer to allow ongoing usage of the computer.

Figure 1:
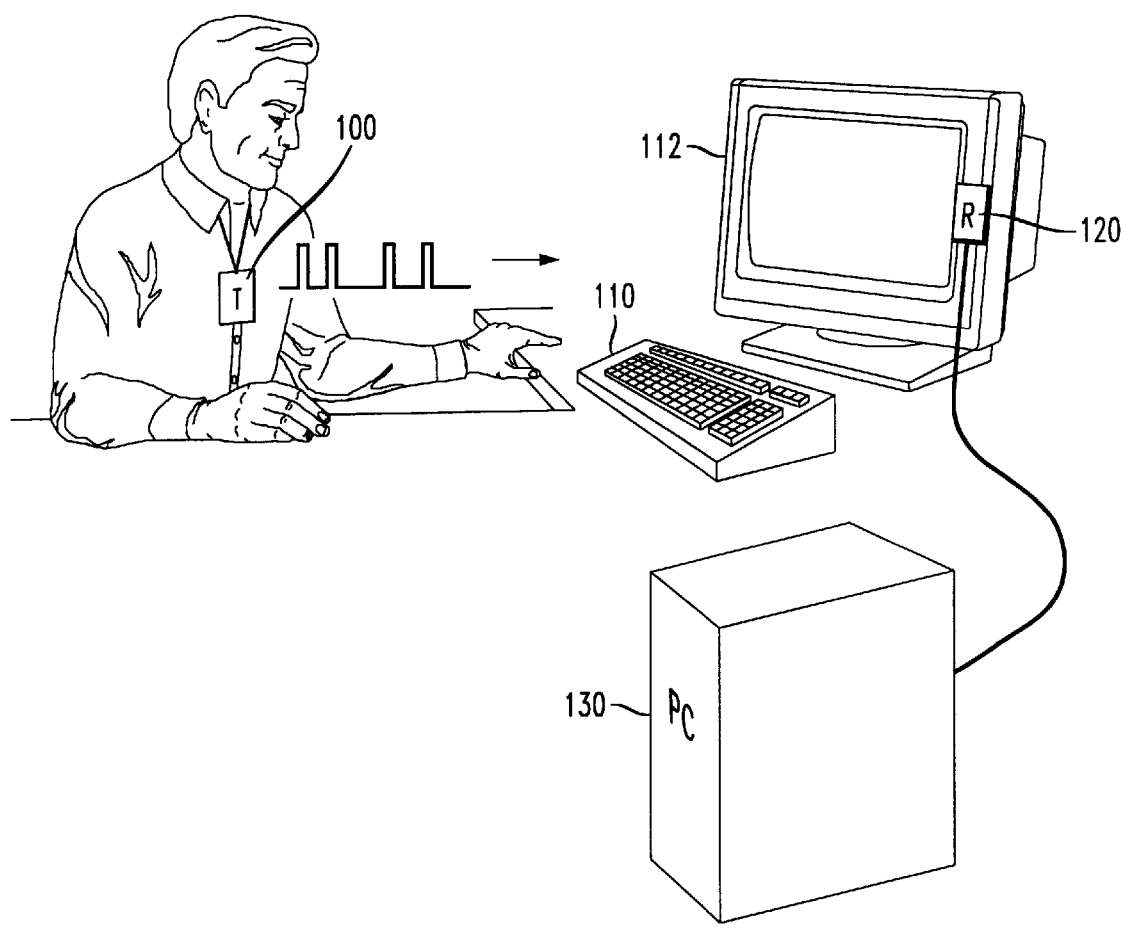
FIG. 1 shows a proximity detector for continuous detection of valid computer user in accordance with the principles of the present invention.

In particular, FIG. 1 shows a user wearing a proximity badge 100 for detection when in the proximity of a proximity reader 120 of a computer 130, in accordance with the principles of the present invention. The proximity badge 100 is preferably carried at all times by the user, e.g., worn as a necklace as shown in FIG. 1, worn as a badge, carried in a pocket, etc. Of course, the user may carry the proximity badge 100 in their hand and place it on the table near the computer when operating the computer, but this method risks leaving the computer operational when unattended if the user forgets to take the proximity badge 100 with him or her when leaving the room. If this method is used, it is preferable that the proximity badge 100 be tethered to the user in some way.

The communication between the proximity badge 100 and the proximity reader 120 may be by wireless radio frequencies (RF), or by infrared (IR) optics, as known in the art, as depicted in FIG. 1. The proximity reader 120 and proximity badge 100 are tuned to operate only within a desired range which varies depending upon the application. Most preferably the range will extend throughout the room in which the computer 130 is contained. However, in extremely sensitive applications, the power of the proximity reader 120 and/or proximity badge 100 can be downgraded to operate only within a few feet of one another.

It may be desirable to add hysteresis to the range in which the proximity system operates, e.g., so that when the user is standing at the brim of the range, the computer 130 will not repeatedly be rendered operational and non-operational until the user steps back within safe range.

The proximity detection system in accordance with the present invention includes functionality installed in the computer 130 to prevent use of desired features of the computer 130 when the proximity badge 100 is not in the proximity of the proximity reader 120. One embodiment of the process performed by the computer 130 in conjunction with the proximity reader 120 is shown in FIGS. 2A and 2B.

Figure 2A:
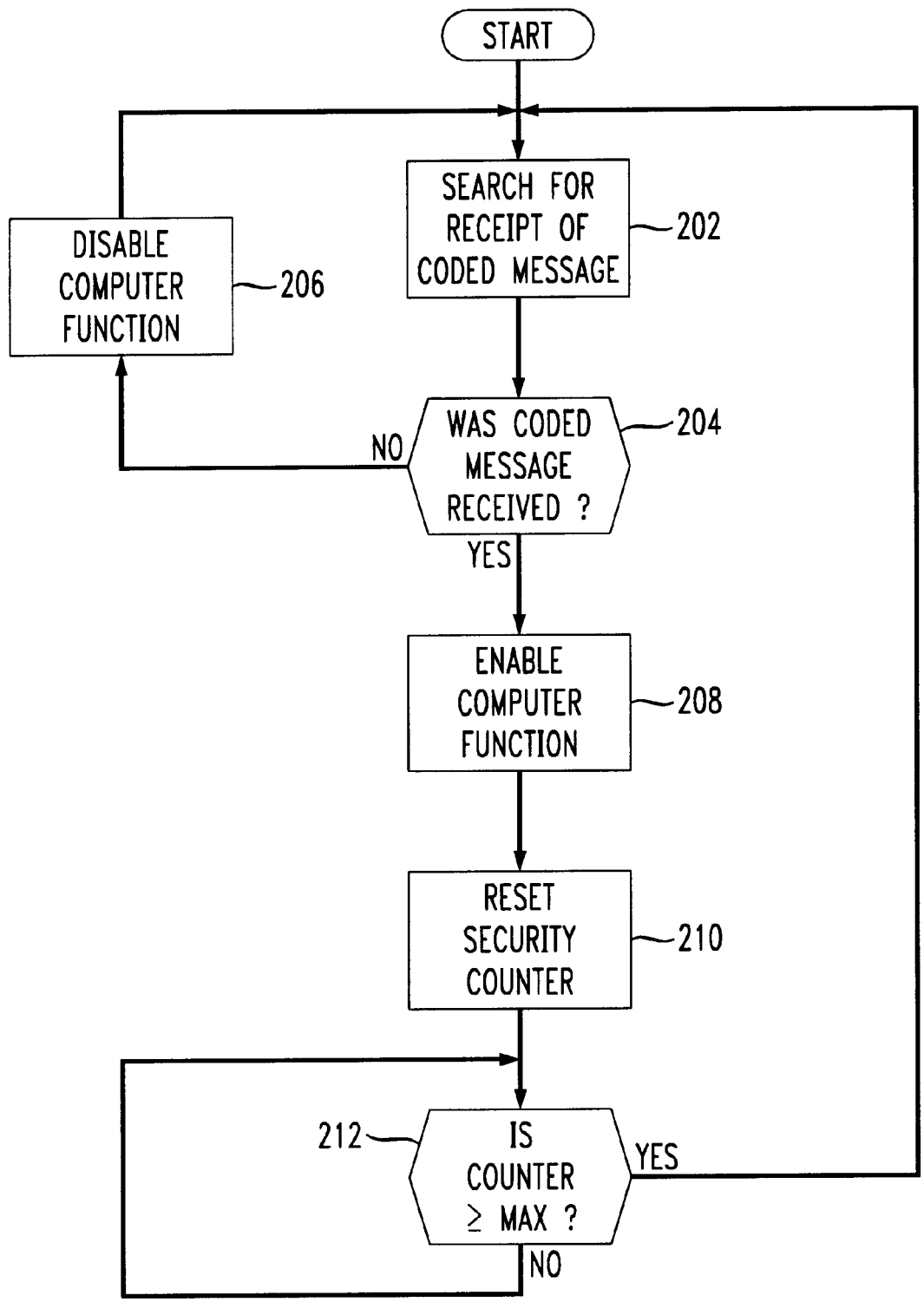
FIG. 2A shows a process for continuously enabling a computer in accordance with a first embodiment of the present invention.
Figure 2B:
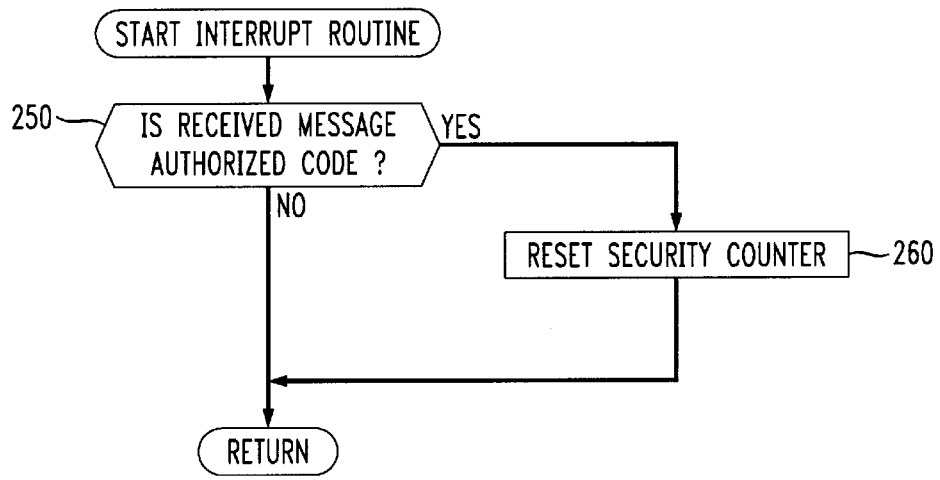
FIG. 2B shows an interrupt routine for use with the first process shown in FIG. 2A.

FIGS. 2A and 2B show processes installed within the kernel, operating system, and/or application program(s) of the computer 130, depending upon the level of security desired. The process may be installed in a separate application program running on a multi-tasking operating system. Installation of the process in the kernel or operating system will prevent any successful use of the computer 130 without having the proximity badge 100 within the proximity of the proximity reader 120, whereas installation of the process in an application program will prevent use of that application program, but will allow use of the operating system of the computer. For highest security, it is preferred that the processes of the present invention be implemented at or below the operating system of the computer 130.

In the first step 202 of the process shown in FIG. 2A, the computer 130 searches for indication of receipt of a binary coded message from a proximity badge 100. Upon receipt of a binary coded message, the proximity reader 120 compares the received coded message with authorizing codes contained in a secure database in step 204 to determine if the detected proximity badge 100 is authorized to use the particular computer 130 in which the system is installed. If the received coded message does not correspond to an authorized code, then the process continues to step 206 where the relevant features of the computer 130 are disabled. If the process is installed in the kernel or the operating system, it is preferred that the operating system and/or keyboard be rendered non-operational in step 206. If the process is installed in an application program, then it is preferred that the application program be prevented from operating in step 206.

It is most preferable that step 206 not cause any change to the status of information or programs already operating on the computer 130, just that step 206 prevent further operation of the computer 130. For instance, if the authorized user wearing the correctly authorized proximity badge 100 momentarily steps out of the room, and another person wearing a proximity badge for a different computer walks by, it is not desirable for the computer to close the application program or operating system. Rather, when the authorized user returns to the room, it is desirable that the subsequent re-activation of the computer 130 continue from the point at which the user left off.

For instance, the computer function disabled in step 206 may operate as a screen saver to prevent visual display of information on the display 112 when the proximity badge 100 is not in the proximity of the proximity reader 120. Alternatively or additionally, the computer may enter and remain in a standby mode of operation and lock out any keyboard entry until the authorized user returns to the room as detected by the proximity reader 120.

If an authorized proximity badge 100 is within the prescribed distance from the computer, and thus an authorizing binary coded message was received by the proximity reader 120, then step 208 enables the computer function(s) which would have been disabled in step 206.

An important feature of the present invention is the continuous nature of the authorization to the computer 130 to operate. Conventional password entry allows one-time access beyond a point in a program of a computer. For instance, once a suitable password has been entered, complete access to network resources may be granted until the computer is powered down. The present invention provides a continuous check for an authorized user to prevent further operation of the relevant feature of the computer as soon as the authorized user leaves the proximity of the computer 130.

One way of implementing the continuous authorization in accordance with the principles of the present invention is to install a process in the computer 130 which repeatedly (on a timed or other basis) checks to see if the authorizing proximity badge 100 remains within the proximity of the proximity reader 120 of the computer 130. Step 210 accomplishes this implementation by resetting a security counter, which is otherwise incremented either based on computer cycles, time, number of calls to a particular routine in the computer 130, or other basis. Preferably, the counter is based on a safe amount of time that the computer 130 can be left unattended without risking unauthorized use. This safe time is based on the particular application as determined by the user.

Step 212 checks the value of the security counter to determine if it is time to check for the presence of the proximity badge 100. If the security timer has not yet reached its present maximum value (determined by the user based on their particular needs), then step 212 repeats. Once the security counter has reached the maximum count, i.e., the point at which it is desired to check for the presence of the proximity badge 100, then the process returns to step 202 to search for the receipt of the coded message.

Given an estimated time in which a computer may be accessed by an unauthorized individual once an authorized individual leaves the premises, a maximum value of the security counter corresponding to about 10 to 20 seconds would be considered suitable for most applications, but shorter or longer times are expected and anticipated based on particular needs, in accordance with the principles of the present invention.

FIG. 2B shows an interrupt routine or process used to automatically reset the security counter upon detection of an authorizing binary code from a proximity badge 100, to avoid occasional stoppages of the computer 130 while the proximity reader 120 is waiting for receipt of a message from an authorized proximity badge 100. The interrupt routine operates upon reception by the computer 130 of a binary coded message from any proximity badge 100. In the disclosed embodiment, the proximity reader 120 outputs serial data to a serial port of the computer 130, which contains a UART which causes the interrupt routine of FIG. 2B to operate upon receipt of a coded message from a proximity reader 120.

In the first step 250 of the interrupt routine, the received coded message is compared against authorizing codes contained in a secure database to determine if the received coded message corresponds to an authorized user of the computer 130. If not, then the interrupt routine simply exits and returns to the previously operating routine (if any) without any change to the security counter. However, if the received coded message which caused the interrupt does match an authorizing code, then the security counter 260 is reset in step 260 before returning to the previously operating routine.

Figure 3:
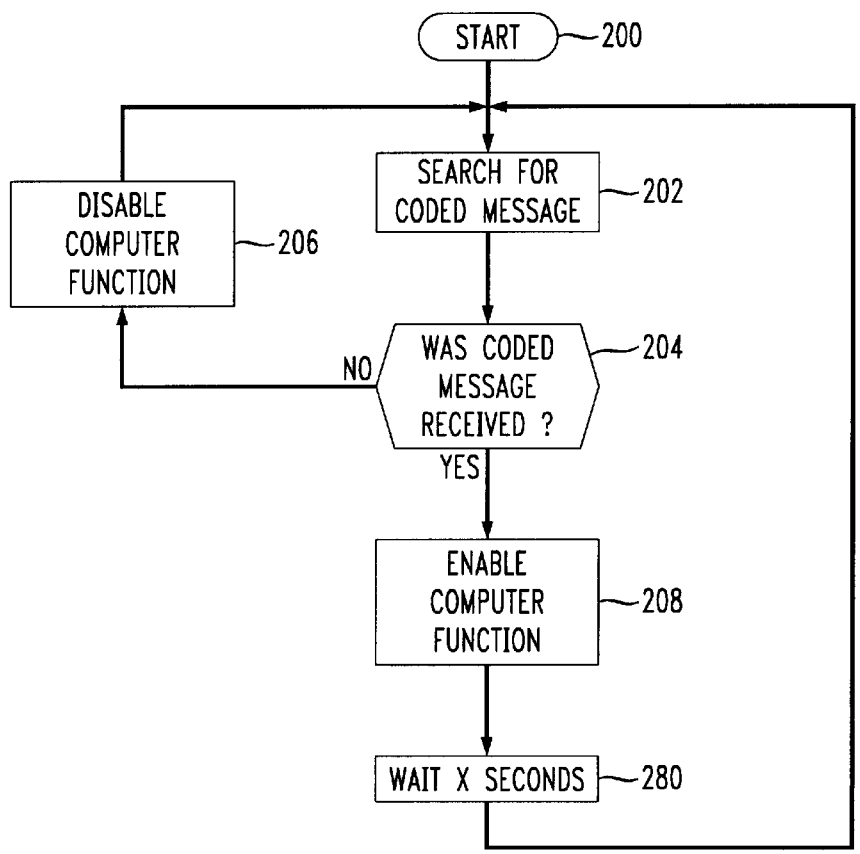
FIG. 3 shows an alternative process for continuously enabling a computer in accordance with a second embodiment of the present invention.

FIG. 3 shows an alternative process to allow continuous authorization of a user in accordance with the principles of the present invention.

In FIG. 3, steps 202, 204, 206 and 208 are performed as described with respect to FIG. 2A. However, after enabling the desired computer function in step 208, the process merely waits a predetermined amount of time in step 280 before returning to step 202 to re-check for receipt of a coded message from an authorizing proximity badge 100. In the disclosed embodiment, this process operates simultaneously with the normal operation of the computer so that an authorized user can operate the computer while the process is waiting in step 280.

Where RF communications are undesirable, such as in an air traffic control tower where electronic emissions are severely restricted, the present invention may be implemented with an infrared (IR) proximity badge and an IR reader. Of course, positioning of the IR proximity badge with respect to the IR reader is important to allow line of sight communications. The proximity badge 100, if an IR device, may be operated by an internal battery in environments where RF frequencies are undesirable, or may receive power from an inductively coupled RF signal from an external powering device located close to or in the proximity reader 120.

The process shown in FIG. 3 is particularly useful in applications with a continuously transmitted encoded message from a proximity device, e.g., a continuous frequency or unique combination of frequencies corresponding to an authorized user.

The processes of FIGS. 2A, 2B and 3 are equally applicable to the use of IR as to the use of RF. However, in step 202 shown in FIGS. 2A and 3, the coded message sent by an occasionally transmitted IR signal may be buffered in a serial universal asynchronous receiver transmitter (UART) of the computer 130, and simply read by the computer 130. Otherwise, the processes shown in FIGS. 2A, 2B and 3 for use with an IR proximity detection system comprising an IR proximity badge 100 and IR proximity reader 120 are as described above with respect to the use of RF.

In addition, the proximity system may include a detection of the presence of an object (i.e., a person) synchronously with the detection of an authorized proximity detector. For instance, FIG. 4 shows a process for synchronously detecting the presence of a person in proximity to the computer together with a check of authority of the detected person.

Figure 4:
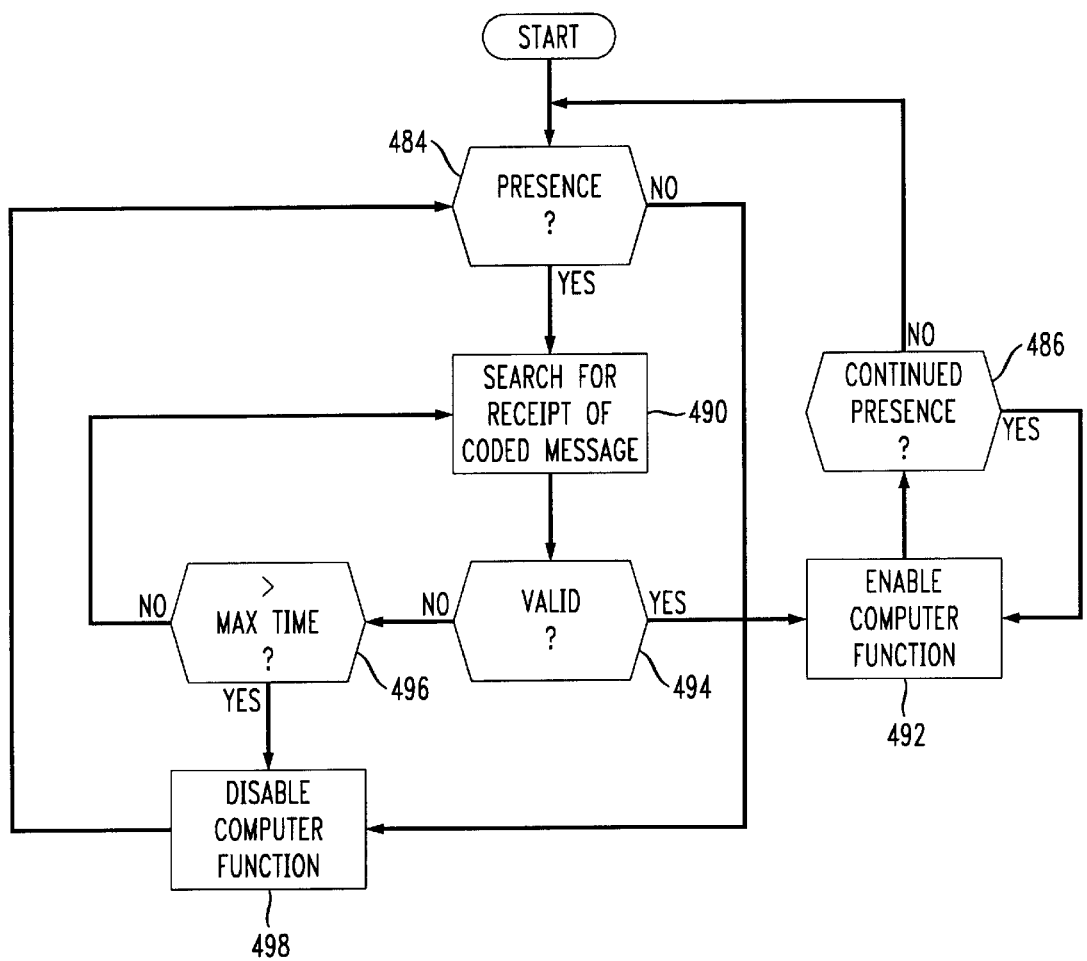
FIG. 4 shows a process for synchronously detecting the presence of an object in proximity to the computer with a check for validity or authority of the detected object.

In FIG. 4, presence of a person is detected in step 482. Presence may be determined in any of a number of ways, e.g., by detection of a keypress on the keyboard. Alternatively, the presence may be detected by the blockage of an infrared beam to an infrared receiver, or by interference with a transmitted radio frequency (RF).

Presence of a person is detected in step 484 of FIG. 4. If a person is detected in step 484, the process searches for receipt of a coded message in step 490. Step 494 determines whether or not a valid coded message was received. If a valid coded message was received, the relevant computer function is enabled in step 492. If a valid coded message was not received, then a counter is checked in step 496 to determine if a maximum length of time has expired since a valid coded message was received. Although the maximum length of time is dependent upon the application, an example of 30 seconds has proved suitable. If the maximum length of time has not expired in step 496, then the process returns to step 490 to again search for receipt of a coded message. If, on the other hand, the maximum amount of time has been exceeded, then the process passes to step 498, wherein the relevant computer function is disabled and the process returns to step 484 to again determine the physical presence of a person in the proximity of the computer. If a valid coded message was received thus causing enablement of the relevant computer function in step 492, then continued presence is determined in step 486. If the person continues to be within the proximity of the computer, then step 486 continues to allow enablement of the relevant computer function in step 492. If, however, the person leaves the proximity of the computer, then the process will restart at step 484.

Thus, as long as the authorized person remains within the proximity of the computer, the coded message is not again searched for. The process of FIG. 4 'resets' after the person has left the proximity of the computer to thereafter require re-transmission of the coded message to the proximity reader. This avoids unnecessary checking and re-checking of an authorized proximity badge within the proximity of the computer.

Figure 5:
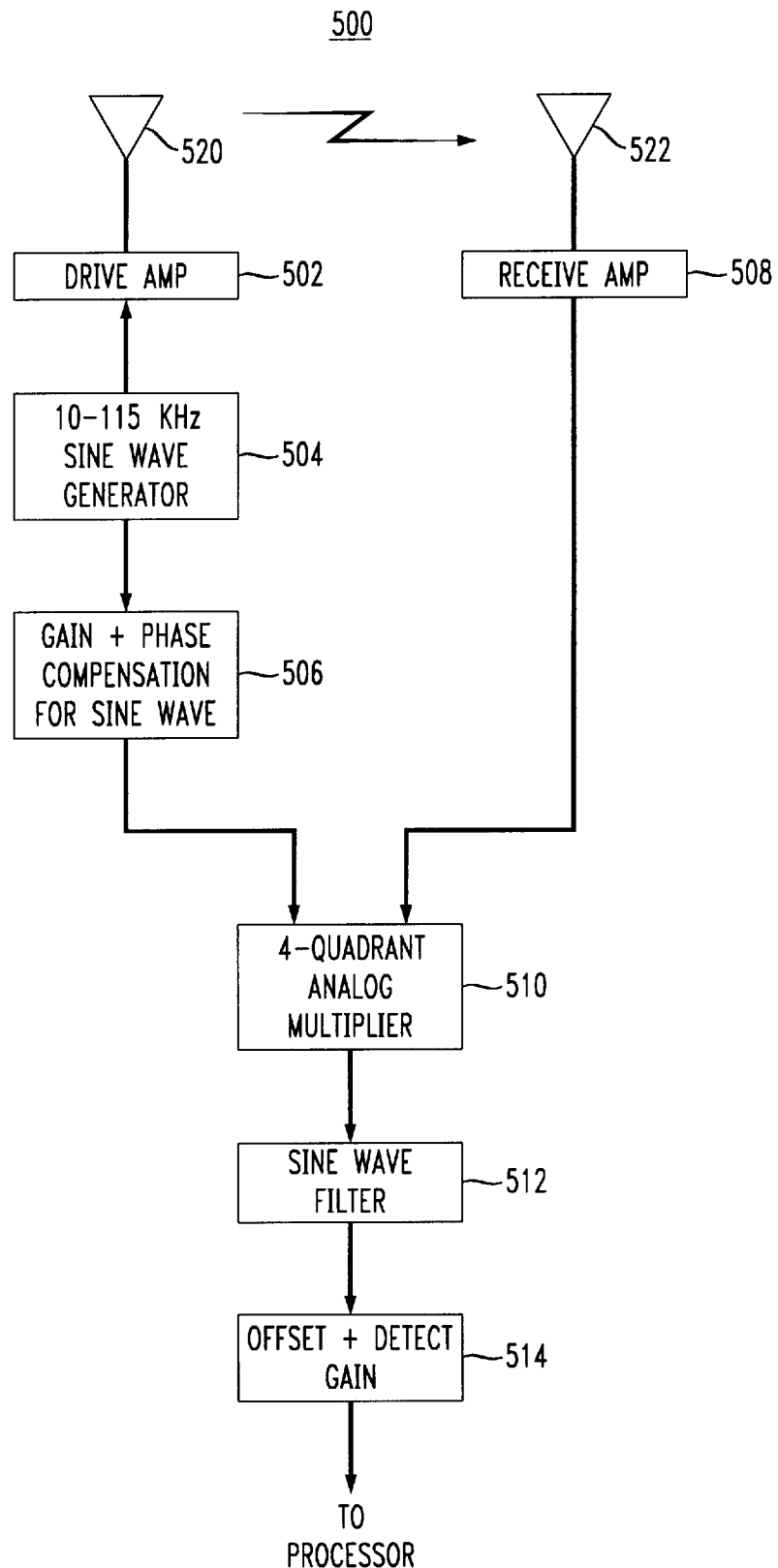
FIG. 5 shows a block diagram of an RF presence detector.

FIG. 5 shows a block diagram of one example of a presence detector utilizing a radio frequency for detection of a person interrupting transmission and reception of a frequency signal. Any new object affecting the electromagnetic field between a transmitting antenna 520 and a receiving antenna 508 is detected as a presence in the presence detector 500 shown in FIG. 5.

The RF presence detector shown in FIG. 5 outputs a reference constant frequency, and compares the reference constant frequency with that which is received to detect an offset from the level at which the system was tuned when installed in the room.

In particular, in FIG. 5, a sinewave generator 504 provides a constant frequency signal to a drive amplifier 502 and transmitted from antenna 520. The transmitted signal is received at a receive amplifier 508, and input to a four-quadrant analog multiplier 510. The four-quadrant analog multiplier looks at both the reference transmitted signal and the received signal to output a multiplication of the difference. Thus, the four-quadrant analog multiplier 510 also receives as a reference the frequency signal from the sinewave generator 504 as adjusted in compensator 506 for gain and phase corresponding to the delay and loss between the transmitter and the receiver. The output sinewave is filtered in filter 512, and the difference is amplified and detected in offset and detect gain module 514 and output to a processor to determine a presence of a person in a proximity of the antennas 520, 522.

Antennas 520, 522 may be simple devices, e.g., identical lengths of hookup wire, audio cable or flat foil.

Figure 6:
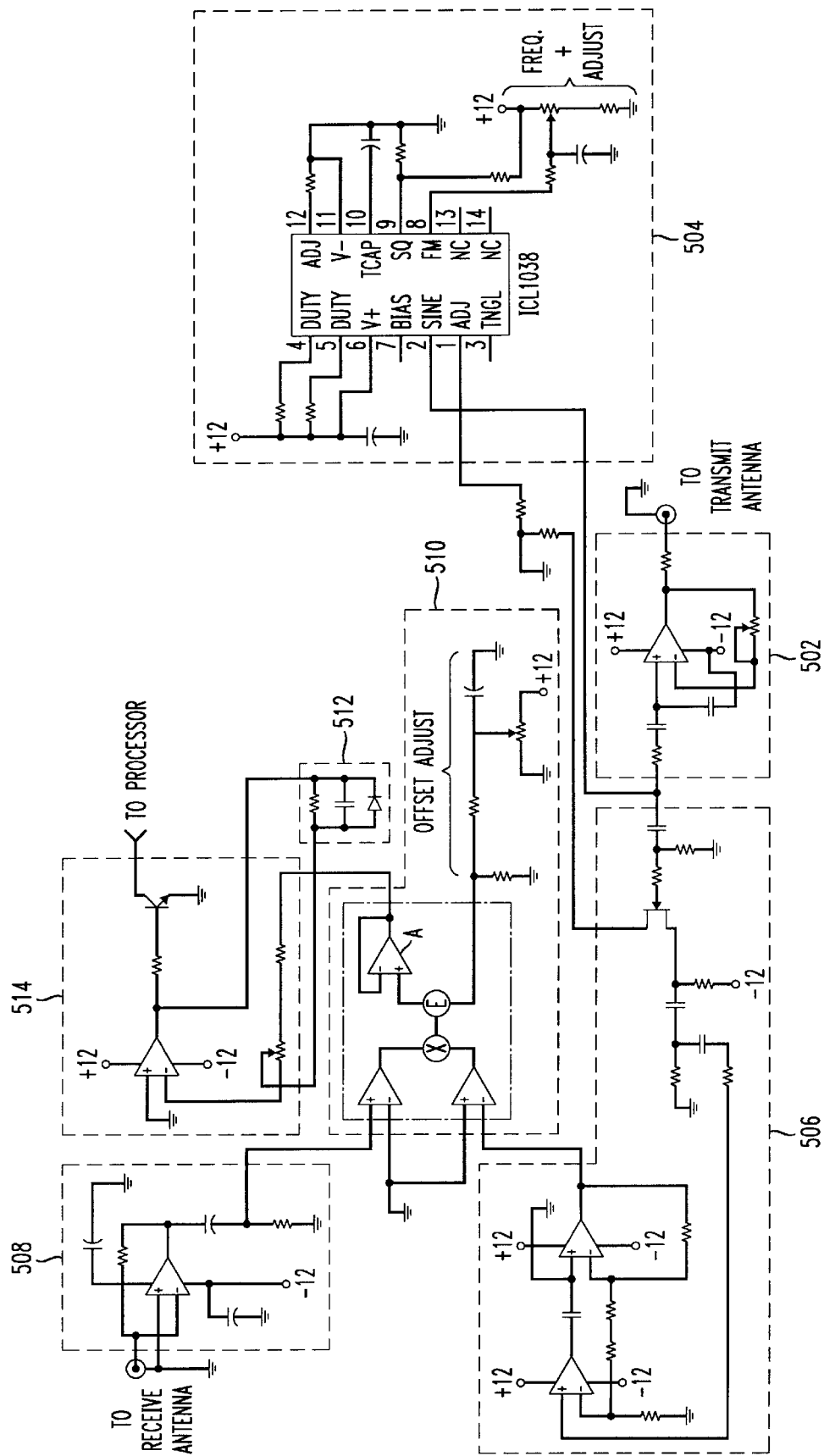
FIG. 6 is a schematic diagram of the RF presence detector shown in FIG. 5.

FIG. 6 is a more detailed schematic diagram of the RF presence detector shown in FIG. 5.

Figure 7A:
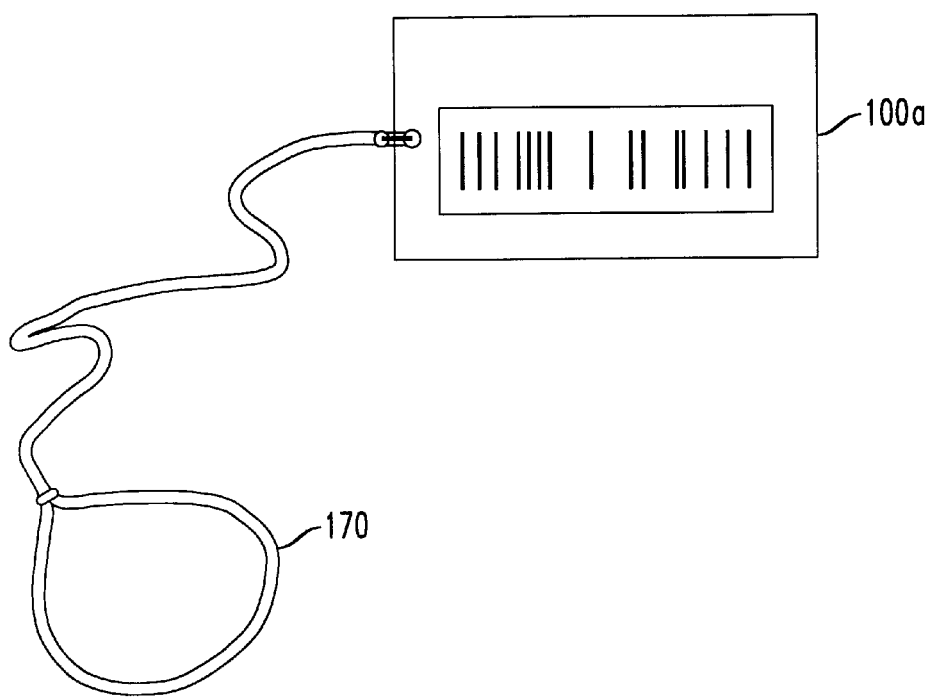
FIG. 7A shows a proximity badge containing a bar code in accordance with a third embodiment of the present invention.
Figure 7B:
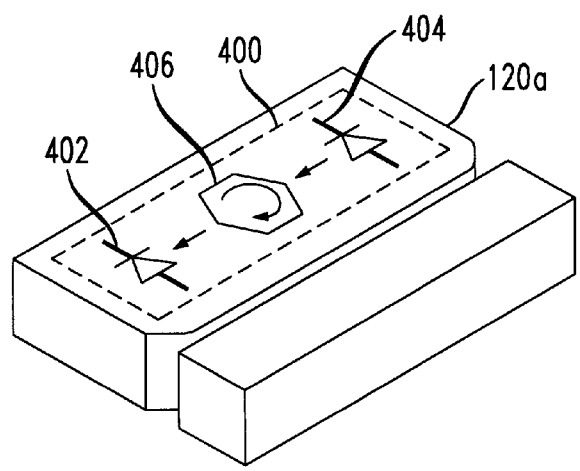
FIG. 7B shows an optical proximity bar code reader for detecting the presence of the proximity badge shown in FIG. 7A.
Figure 8:
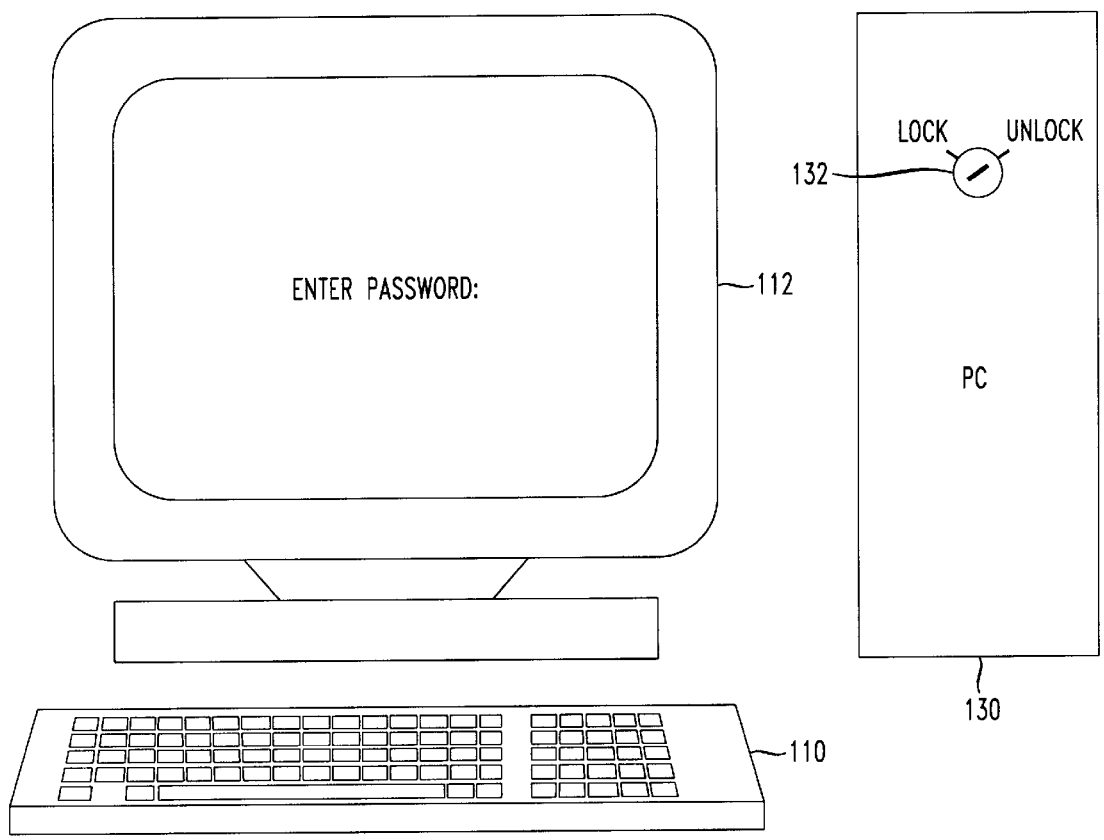
FIG. 8 shows the prior art method of requiring entry of a password to enable a computer for use.

Another embodiment of the present invention is shown in FIGS. 7A and 7B. This embodiment utilizes bar codes printed on a proximity badge 100a, which are placed within optical distance of an optical proximity reader 120a. In this embodiment, the proximity badge 100a contains an authorizing code in the form of an optical bar code. To authorize continuous use of the computer, the proximity badge 100a is placed in a cradle of the proximity reader 120a. The coded message is contained in the bar code on the proximity badge 100a, and is read by the optical proximity reader 120a.

The proximity reader 120a comprises a conventional bar code reader system 400 including a light emitting diode (LED) or other light source 404, a scanning mechanism 406 such as a rotating mirror, and a light detector 402. The detected authorizing code is transmitted to the computer 130 (FIG. 1) via a serial cable to a serial port for use by the processes as shown in FIGS. 2A, 2B and 3 as previously described.

A tether 170 on the proximity badge 100a allows free movement of the users arms while working on the computer 130, but retrieves the proximity badge 100a if the user forgets to remove the proximity badge 100a from the proximity reader 120a before leaving the room.

The embodiment shown in FIGS. 4A and 4B is particularly useful for applications requiring lighter security, as the optical bar code can be easily copied by an unauthorized user.

While all embodiments herein provide continuous security of a computer (as opposed to the conventional method of password entry to provide a one-time authority check), the present invention does not preclude and in fact prefers the use of passwords in addition to the continuous authorization in accordance with the principles of the present invention to provide increased security.

While the invention has been described with reference to the exemplary preferred embodiments thereof, those skilled in the art will be able to make various modifications to the described embodiments of the invention without departing from the true spirit and scope of the invention.

What is claimed is:

1. A proximity detection system for a computer, comprising:

a detection module that continuously determines a presence of an authorizing code from an authorized user;

a synchronous detection module that continuously detects a presence of a person synchronously with said presence of said authorizing code;

a timer associated with said computer, said timer being operable to expire upon at least one of non-receipt of said authorizing code and a failure to detect said presence of said person; and a disabling module in said computer, said disabling module disabling at least one feature of said computer based on an expiration of said timer.

2. The proximity detection system for a computer according to claim 1, wherein:

said at least one feature is a display function.

3. The proximity detection system for a computer according to claim 1, wherein:

said at least one feature is an operation mode of a processor in said computer.

4. The proximity detection system for a computer according to claim 1, wherein:

said at least one feature is input from a keyboard.

5. The proximity detection system for a computer according to claim 1, further comprising:

an enabling module in said computer, said enabling module enabling said at least one feature of said computer based on receipt of said authorizing code from said authorized user of said computer and said detection of said person.

6. The proximity detection system for a computer according to claim 5, wherein:

said enabling module is adapted and arranged to reset said timer substantially upon receipt of said authorizing code and said detection of said person.

7. A proximity detection system for a computer, comprising:

a detection module that continuously determines a presence of an authorizing code from an authorized user;

a synchronous detection module that continuously detects a presence of a person synchronously with said detection of said authorizing code; and a disabling module in said computer, said disabling module disabling at least one feature of said computer based on at least one of a determination by said detection module that said authorizing code is not present and a determination by said synchronous detection module that said person is not present.

8. The proximity detection system for a computer according to claim 7, wherein:

said at least one feature is a display function.

9. The proximity detection system for a computer according to claim 7, wherein:

said at least one feature is an operation mode of a processor in said computer.

10. The proximity detection system for a computer according to claim 7, wherein:

said at least one feature is input from a keyboard.

11. The proximity detection system for a computer according to claim 7, further comprising:

an enabling module in said computer, said enabling module enabling said at least one feature of said computer based on said determination by said detection module that said authorized code is present and said determination by said synchronous detection module that said person is synchronously present with said detection of said authorizing code.

12. A proximity detection system for a computer, comprising:

authorizing code detection means for continuously detecting an authorizing code from an authorized user of said computer;

synchronous detection means for continuously detecting a presence of a person synchronously with said detection of said authorizing code by said authorizing code detection means; and disabling means for disabling at least one feature of said computer based on at least one of said determination by said authorizing code detection means that said authorizing code is not detected and a determination by said synchronous detection means that a person is not present synchronously with said detection of said authorizing code.

13. The proximity detection system for a computer according to claim 12, wherein:

said at least one feature is a display function.

14. The proximity detection system for a computer according to claim 12, wherein:

said at least one feature is an operation mode of a processor in said computer.

15. The proximity detection system for a computer according to claim 12, wherein:

said at least one feature is input from a keyboard.

16. The proximity detection system for a computer according to claim 12, further comprising:

enabling means for enabling said at least one feature of said computer based on said determination by said authorizing code detection means that said authorized user is within said proximity of said proximity reader means and said determination by said synchronous detection means that a person is present synchronously with said detection of said authorizing code.

17. A method of continuously detecting an authorized user within a proximity of a computer, said method comprising:

determining receipt of a coded message from said authorized user indicating that said authorized user is within a proximity of said computer;

determining a presence of a person synchronously with receipt of said coded message from said authorized user;

disabling at least one function of said computer if at least one of said coded message was not received from said authorized user and said person was not determined as being synchronously present with said receipt of said coded message from said authorized user;

enabling said at least one function of said computer if said coded message is received from said authorized user and said person is determined to be synchronously present with said receipt of said coded message from said authorized user;

said step of enabling and said step of disabling being repeatedly performed as said authorized user moves in and out of said proximity of said computer.

18. The method of continuously detecting an authorized user within a proximity of a computer according to claim 17, wherein:

said step of disabling comprises disabling a display of said computer; and said step of enabling comprises enabling said display of said computer.

19. The method of continuously detecting an authorized user within a proximity of a computer according to claim 17, wherein:

said step of disabling comprises placing a processor of said computer in a standby mode; and said step of enabling comprises placing said processor of said computer in an operating mode.

20. The method of continuously detecting an authorized user within a proximity of a computer according to claim 17, wherein:

said step of disabling comprises disabling input from a keyboard of said computer; and said step of enabling comprises enabling a display of said computer.

21. A proximity detection system comprising:

means for enabling a computer when an authorizing code from a valid user is present and a person is synchronously present with a receipt of said authorizing code; and means for disabling said computer when at least one of said authorizing code from said valid user is not present and a person is not synchronously present with said presence of said authorizing code.

* * * * *